(12) United States Patent  
Harris

(10) Patent No.: US 7,349,606 B2  
(45) Date of Patent: Mar. 25, 2008

(54) THREE COLOR DIGITAL GOBO SYSTEM

(75) Inventor: Jeremiah J. Harris, Las Vegas, NV (US)

(73) Assignee: Production Resource Group, L.L.C., New Windsor, NY (US)

( * ) Notice: Subject to any disclaimer, the term of this patent is extended or adjusted under 35 U.S.C. 154(b) by 0 days.

(21) Appl. No.: 11/677,022

(22) Filed: Feb. 20, 2007

(65) Prior Publication Data

US 2007/0140630 A1    Jun. 21, 2007

Related U.S. Application Data

(63) Continuation of application No. 11/386,194, filed on Mar. 21, 2006, now Pat. No. 7,181,112, which is a continuation of application No. 10/995,612, filed on Nov. 22, 2004, now Pat. No. 7,020,370, which is a continuation of application No. 10/616,481, filed on Jul. 8, 2003, now Pat. No. 6,823,119, which is a continuation of application No. 09/771,953, filed on Jan. 29, 2001, now Pat. No. 6,588,944.

(51) Int. Cl.  
*G02B 6/44* (2006.01)  
*G02B 26/00* (2006.01)  
*G09F 13/00* (2006.01)

(52) U.S. Cl. ............... 385/100; 385/115; 385/116; 385/88; 385/147; 385/901; 359/291; 362/232; 362/551; 362/556

(58) Field of Classification Search ............ 385/88, 385/89, 92, 49, 115, 116, 14, 147, 901, 37, 385/100; 382/217, 223, 224; 348/241, 239, 348/246; 359/291, 223, 224; 362/232, 551, 362/556, 293, 296  
See application file for complete search history.

(56) References Cited

U.S. PATENT DOCUMENTS

| | | | |
|---|---|---|---|
| 5,053,765 A | 10/1991 | Sonehara et al. | 340/815.31 |
| 5,774,174 A | 6/1998 | Hardie | 348/38 |
| 5,828,485 A | 10/1998 | Hewlett | 359/291 |
| 5,940,204 A | 8/1999 | Hewlett | 359/298 |
| 6,057,958 A | 5/2000 | Hunt | 359/291 |
| 6,188,933 B1 | 2/2001 | Hewlett et al. | 700/19 |
| 6,208,087 B1 | 3/2001 | Hughes et al. | 315/291 |
| 6,256,136 B1 | 7/2001 | Hunt | 359/291 |
| 6,538,797 B1 | 3/2003 | Hunt | 359/291 |
| 6,588,944 B2 | 7/2003 | Harris | 385/88 |
| 6,617,792 B2 | 9/2003 | Hughes et al. | 315/32 |
| 6,823,119 B2 | 11/2004 | Harris | 385/100 |
| 6,891,656 B2 | 5/2005 | Hunt | 359/291 |
| 7,020,370 B2 | 3/2006 | Harris | 385/100 |
| 7,181,112 B2 * | 2/2007 | Harris | 385/100 |
| 2002/0181070 A1 | 12/2002 | Hewlett | 359/291 |
| 2005/0100289 A1 | 5/2005 | Harris | 359/291 |
| 2006/0177185 A1 | 8/2006 | Harris | 385/100 |

* cited by examiner

*Primary Examiner*—Brian M. Healy  
(74) *Attorney, Agent, or Firm*—Law Office Scott C Harris

(57) ABSTRACT

A system of digitally controlling light output by producing separate control signals for different colors of light. The light is contained in an optical waveguide, either prior to shaping or after shaping. Each of the control signals is coupled to a digitally controlled device which controls the shape of the light output. The digital controlling device can be digital mirror devices, for example.

74 Claims, 2 Drawing Sheets

THREE COLOR DIGITAL GOBO SYSTEM

CROSS-REFERENCE TO RELATED APPLICATIONS

This application is a continuation application of and claims priority to U.S. application Ser. No. 11/386,194, filed Mar. 21, 2006; now U.S. Pat. No. 7,181,112 which is a continuation application of U.S. application Ser. No. 10/995,612, filed Nov. 22, 2004, now U.S. Pat. No. 7,020,370; which is a continuation of U.S. application Ser. No. 10/616,481, filed Jul. 8, 2003, now U.S. Pat. No. 6,823,119; which is a continuation of U.S. application Ser. No. 09/771,953, filed Jan. 29, 2001, now U.S. Pat. No. 6,588,944.

BACKGROUND

The U.S. Pat. No. 5,940,204 has suggested using a digital device to shape the contour and outlines of light that is projected through a high-intensity projector. Such a system may be used, for example, for stage lighting in theatrical and concert events. The Icon M™, available from Light and Sound Design, Ltd; Birmingham, England, uses this technique.

Different patents owned by Light and Sound Design, Ltd. suggest that the digital gobo should be formed from either a digital mirror, or from any other pixel level controllable digital device.

Cogent Light of Los Angeles, Calif. has technology that allows packaging a high intensity light beam into a form that allows it to be placed into a light waveguide, e.g., a fiber optic cable.

SUMMARY

The present application teaches a system of packaging light into a light waveguide such as a fiber optic cable, and adjusting the shape of the light using a digitally controllable, pixel level controllable light shaping element, such as a digital mirror device (DMD), available from Texas Instruments.

In one embodiment, the system controls and produces high-intensity light output using three separate digital gobo devices. The digital gobo devices can be separately controlled such that each digital gobo device receives information indicative of shaping a separate primary color. The primary colors are handled separately, and/or combined at the object of the high-intensity light output.

BRIEF DESCRIPTION OF THE DRAWINGS

These and other aspects will now be described in detail with reference to the accounts, wherein.

DETAILED DESCRIPTION

Details of a lighting instrument using a digital gobo are described in many patents owned by Light and Sound Design Ltd and the basic features are also present in Light and Sound Design's Icon M™ lighting fixture. The system described herein may use any of these basic features including details of computer-controlled cooling, and optics.

Figure 1:
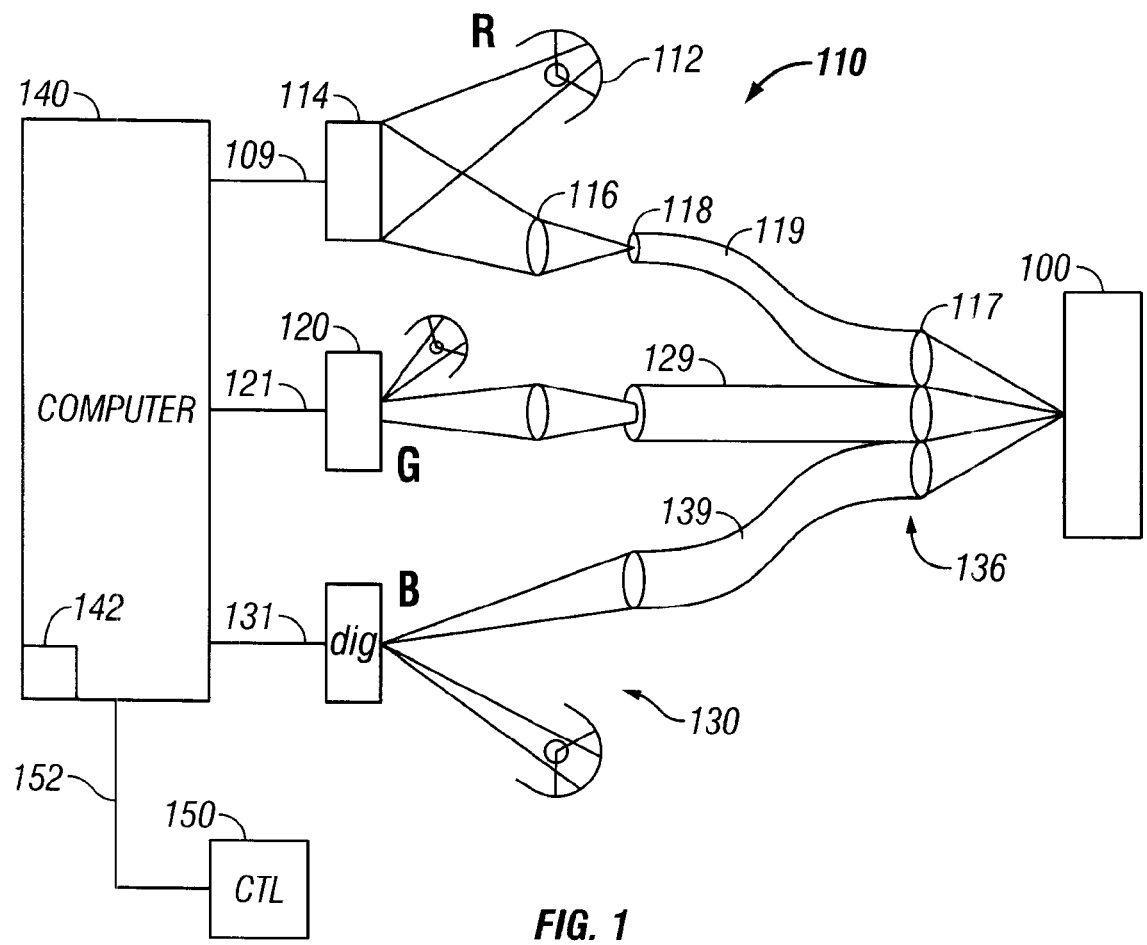
FIG. 1 is a block diagram of a three color version of the system.

A block diagram of the basic system is shown in FIG. 1. An object of lighting 100 is shown. This object may be a stage, or may be any other object which is conventionally by a high-intensity lighting device. The high-intensity lighting device may be, for example, a lighting device which produces more than 100 watts of lighting output, preferably more than 500 watts of lighting output. Devices of this type conventionally use a spotlight with a special high intensity bulb for producing the desired illumination effect.

In FIG. 1, three separate lighting units are formed. Each lighting unit is responsible for producing light of a separate primary color. The primary colors can be red, green and blue for additive colors, and cyan, magenta and yellow for subtractive coloration.

Each of the lighting units 110, 120 and 130 are formed of similar structure. The lighting unit 110 includes a light source 112 which produces light of a specified primary color, here red. The lighting unit 110 may produce red coloration, or may include a white light with a red filter, or may even produce pure white light which is later filtered. The light from source 112 is applied to digital gobo device 114. The digital gobo device 114 may be a digital mirror device available from Texas Instruments. Alternatively, the digital mirror device can be some other digitally controllable, pixel level controllable optical device such as, but not limited to, a grating light valve. The digital gobo device 114 is a controlling computer 140 which runs a specified program 142. A controller 150 may be remote from the computer 140, and connected to the computer by a line 152. For example, the computer 140 may be within a separate lighting fixture along with the lighting elements 110, 120 and 130, and a remote central controller 150 may be a lighting control console.

The light output from the digital mirror device 114 is focused by an optics assembly 116, and focused to the input end 118 of an optical waveguide 119. The optical waveguide 119 may be, for example, a fiber-optic device including single or multiple fibers. The light input at end 119 is output at end 117, and coupled towards the object 100. Analogously, the other lighting unit 120 focuses its light onto a fiber-optic device 129, and the lighting device 130 focuses its light onto a fiber-optic device 139. Each of the lights may have different characteristics, i.e. they may have different coloration. The output of the three fiber-optic devices 119, 129 and 139 are bundled together at area 136, and are pointed towards the object of lighting 100.

In this way, a number of advantages may be obtained. First, brighter light and different kinds of control may be obtained since the system disclosed herein uses three separate light sources. Moreover, better control over the digital gobo may be obtained since red; green and blue are separately controlled. Less flickering may be obtained, and more brightness, as compared with a system that uses only one DMD. Still a system that uses only one DMD is contemplated as described herein.

Different modifications on this system are possible. Other optical waveguides besides a fiber-optic pipe may be used in this system. Moreover, the optical filter which changes each of these separate light components to a separate light characteristic may be located after the digital mirror, e.g. as part of the optics assembly 116, or on the input end of the fiber-optic device 118.

Figure 2:
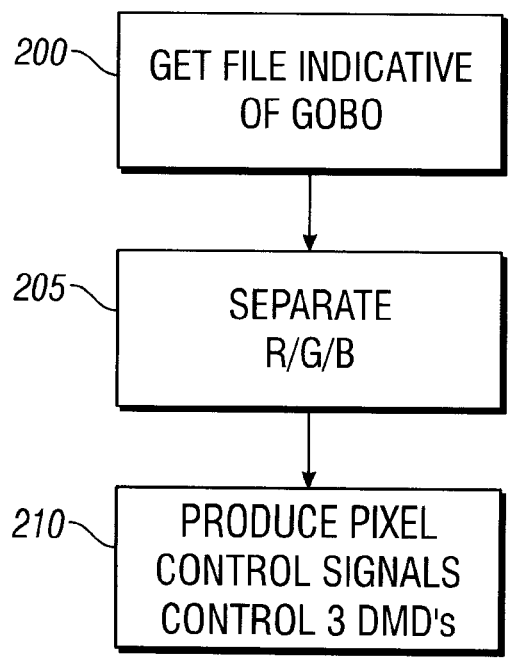
FIG. 2 shows a flowchart of operation of the controlling process for the digital gobo's in FIG. 1.

The system is controlled according to the flowchart of FIG. 2. At 200, a file indicative of a shaping of the light, e.g. a gobo to be used, is obtained. This file may be, for example, of the format described in U.S. Pat. No. 6,057,958. Of course, any file format can be used to define the gobo. The definition can be monochrome, gray scale, or full color (three different colors). At 205, the file is changed to an image, and separated into its primary color components. In the example given herein, the primary color components may include red, green and blue. Hence the file is separated into red, green and blue components. Such separation is conventional in video processing, and produces three separate signals. These three separate signals will eventually be used as the three separate controlling signals 109, 121 and 131 respectively driving the red green and blue subassemblies. The control of the three separate digital mirror devices is carried out at 210.

Figure 3:
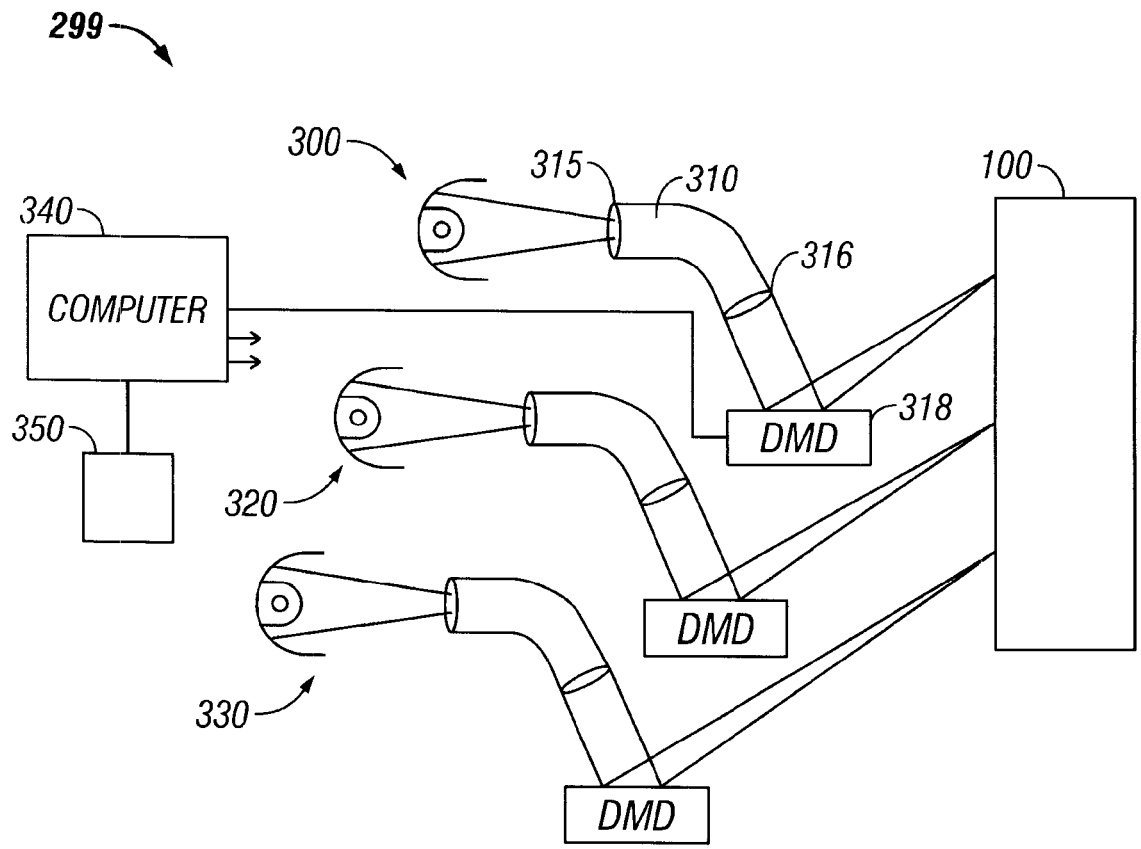
FIG. 3 shows a 3 DMD solution using three optical pipes.

FIG. 3 shows an alternative embodiment which uses a similar concept. In the FIG. 3 embodiment, light is first launched from a light source 300 directly into a fiber-optic cable 310. In this embodiment, the optics are shown as 315, and are formed directly on the input end of the fiber-optic cable 310. Light is launched into the fiber-optic cable, and hence may be focused and or colored by the optics 315. Of course, this system may also use the separate optics shown as 116 in the FIG. 1 embodiment. Light is output on the output in 316 of the fiber-optic cable 310, and coupled to a digital mirror device 318 which shapes the light and reflects it towards the object 100.

The above has described a first channel shown as 299. A separate second channel 320 produces a similar light alteration for the second aspect of light, while a third channel 330 produces a separate output for the third aspect of light; where the aspects can be colors. Each of the digital mirror devices may be controlled by the computer shown as 340 which may be controlled from a remote console 350.

While the above has described control using three separate colors, it should be understood that two separate colors could also alternatively be used. Moreover, while the above describes the different aspects of light which are separately controlled being colors, it should be understood that any different aspect of shaping the beam of light could be separately controlled. For example, one alternative might use different intensity lights, each of which are separately controlled to produce some other kind of effect.

Figure 4:
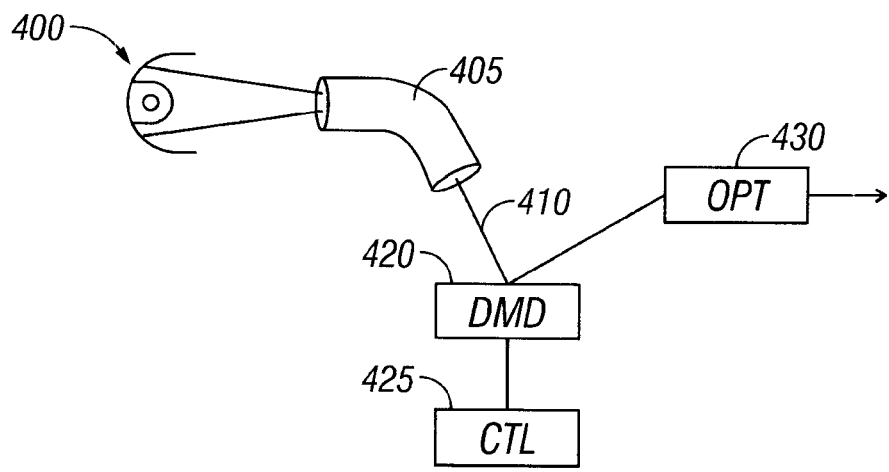
FIG. 4 for shows a single DMD solution.

Another embodiment is shown in FIG. 4. In this embodiment, a single DMD solution is shown. Light from the light 400 is immediately launched into an optical waveguide, e.g. fiber 405. The fiber can be located in any configuration. It produces its light output 410 at the area of DMD 420. As conventional, the DMD is controlled by a controller 425. An optical assembly 430 receives the light from the DMD, and transmits it towards the object of illumination. The optical element 430 may include a color changing element therein, or multiple color changing elements, in order to produce full-color output. For example, the optical element 430 may include a spinning Red/Green/Blue filter which spins in synchronism with the changing of patterns on the DMD.

Although only a few embodiments have been disclosed in detail above, other modifications are possible. All such modifications are intended to be encompassed within the following claims, in which:

What is claimed is:

1. A method of controlling an electronic gobo, comprising:
    obtaining an electronic file indicative of shape of light, and said file having a first part indicative of a first primary color component of said shape of light, a second part indicative of a second primary color component of said shape of light, and representing a different primary color component than said first primary color component, and a third part indicative of a third primary component of said shape of light, said third part representing a different primary color component than either said first primary color component or said second primary color component;
    using said first primary color component, said second primary color component and said third primary color components to separately control different portions indicative of said shape of light, to thereby pass a shaped and colored light that is based on all of said first part representing said first primary color component, said second part representing said second primary color component and said third part representing said third primary color component.

2. A method as in claim 1, wherein said first, second and third primary color components respectively comprise red, green and blue components.

3. A method as in claim 1, wherein said using comprises using said first component to control a first digital gobo device, using said second component to control a second digital gobo device separate from said first digital gobo device, and using said third component to control a third digital gobo device separate from said second digital gobo device.

4. A method as in claim 1, wherein said using comprises using said components to control a single digital gobo device.

5. A method as in claim 3, wherein said digital gobo devices are digital mirror devices.

6. A method as in claim 1, wherein said obtaining comprises obtaining a file indicative of light shaping, and converting the file to an image.

7. A method as in claim 6, wherein said obtaining further comprises separating the file into primary color components.

8. A method of projecting light, comprising:
    coupling light into a fiber optic device, where the light is produced at a first end of the fiber optic device;
    placing a second end of the fiber optic device adjacent a digital gobo device to thereby illuminate the digital gobo device using the light from said coupling;
    controlling the digital gobo device according to a digital control signal indicative of an image that shapes an outer edge of the light that is passed by said digital gobo device; and
    using the digital gobo device to shape the outer edge of the light conducted over the fiber optic device.

9. A method as in claim 8, wherein said coupling comprises coupling light into multiple fiber optic devices.

10. A method as in claim 9, wherein said placing comprises placing the multiple fiber optic devices adjacent multiple different, digital gobo devices.

11. A method as in claim 10, further comprising controlling the multiple digital gobo devices according to separate control signals.

12. A method as in claim 11, wherein the multiple control signals include a first part indicative of a first primary color component of said shape of light, a second part indicative of a second primary color component of said shape of light, and representing a different primary color component than said first primary color component, and a third part indicative of a third primary component of said shape of light, said third part representing a different primary color component than either said first primary color component or said second primary color component, and said controlling comprises using said first primary color component, said second primary color component and said third primary color components to separately control different portions indicative of said shape of light, to thereby pass a shaped and colored light that is based on all of said first part representing said first primary color component, said second part representing said second primary color component and said third part representing said third primary color component.

13. A method as in claim 11, wherein each of the multiple digital gobo devices includes a different color of light that is coupled thereto.

14. A method as in claim 10, wherein there are three fiber optic devices and three digital gobo devices.

15. A method as in claim 8, wherein said digital gobo device is a digital mirror.

16. A method as in claim 8, wherein said coupling light comprises coupling light from a light source that is at least 500 W of power.

17. A method of shaping a light beam using multiple control channels, comprising: producing a first control channel for altering a first aspect of a beam of light; producing a second control signal channel for altering a second aspect of the beam of light; producing a third control channel for altering a third aspect of the beam of light;
using said first, second and third control channels to alter the beam of light, each of said control channels;
altering a different aspect of the beam of light, and said first, second and third control channels collectively operating to shape the output light beam according to a desired shaping signal that is contained within said first, second and third control channels.

18. A method as in claim 17, wherein said aspects are colors.

19. A method as in claim 17, wherein said aspects are intensities of light.

20. A method as in claim 17, further comprising producing a single output light beam from said first, second and third control channels.

21. A method as in claim 17, wherein said using comprises using said first control channel to control a first digital gobo device, using said second control channel to control a second digital gobo device, and using said third control channel to control a third digital gobo device.

22. A method as in claim 17, further comprising, prior to said producing a first, producing a second and producing a third, obtaining a file indicative of shaping of the light, said file including gobo information.

23. A method as in claim 22, further comprising, after producing said file, changing said file to an image.

24. A method as in claim 22, further comprising, after producing said file, separating said file into primary color components.

25. A method as in claim 24, wherein said primary color components comprise red, green and blue components.

26. A method, comprising:
launching a light beam into a fiber-optic device; obtaining outputs from the fiber-optic device, which outputs are colored, wherein at least one of the outputs is a different color than another of the outputs;
separately controlling shaping of the outputs from the fiber optic devices, to project a light that is shaped according to the outputs and said separately controlling wherein said launching a light beam comprises launching a light beam produced from a light source of at least 500 W.

27. A method as in claim 26, wherein said outputs represent different primary colors.

28. A method as in claim 26, wherein said separately controlling shaping comprises controlling digital gobo devices to separately shape different portions of the light.

29. A method as in claim 26, further comprising using optics to alter the light prior to launching the light beam into the fiber-optic device.

30. A method as in claim 29, further comprising using optics to alter the light after launching the light beam into the fiber-optic device.

31. A method as in claim 26, further comprising using optics to alter the light beam after launching the light beam into the fiber-optic device.

32. A method, comprising:
launching light beams into a plurality of fiber-optic devices;
using an optical device to alter the light prier to launching into the fiber-optic device; using another optical device to alter the light after output from the fiber-optic device; shaping the light after output from the fiber-optic device and combining the light from each of the fiber optic devices, to produce shaped light output based on the light from the fiber-optic devices.

33. A method as in claim 32, wherein said optical devices are used to color the light.

34. A method as in claim 33, further comprising using one optical device to color the light in a different color than another of the optical devices.

35. A method as in claim 34, wherein there are three of the fiber-optic devices, each colored with a different primary color.

36. A method as in claim 32, wherein said launching light beams comprises launching light beams that are formed from a light that produces at least 500 W of output.

37. A method as in claim 32, wherein said optical devices are used to focus the light.

38. A method as in claim 32, wherein said shaping comprises controlling a digital gobo device to shape the light.

39. A method as in claim 32, wherein said shaping comprises controlling multiple digital gobo devices to shape the light, each digital gobo device receiving light from a respective fiber-optic device.

40. An electronic gobo apparatus comprising:
a controller, obtaining an electronic file indicative of shape of light, and said file having a first part indicative of a first primary color component of said shape of light, a second part indicative of a second primary color component of said shape of light, and representing a different primary color component than said first primary color component, and a third part indicative of a third primary component of said shape of light, said third part representing a different primary color component than either said first primary color component or said second primary color component; and
a digital gobo assembly, controlled based on all of said first primary color component, said second primary color component and said third primary color component which separately control different portions indicative of said shape of light, to thereby pass a shaped and colored light that is based on all of said first part representing said first primary color component, said second part representing said second primary color component and said third part representing said third primary color component.

41. An apparatus as in claim 40, wherein said first, second and third primary color components, respectively, comprise red, green and blue components.

42. An apparatus as in claim 40, wherein said digital gobo assembly includes a first digital gobo device controlled by said first part, a second digital gobo device separate from said first digital gobo device and controlled by said second part, and a third digital gobo device separate from said first and second digital gobo devices and controlled by said third part.

43. An apparatus as in claim 40, wherein said digital gobo assembly includes a single digital gobo device.

44. An apparatus as in claim 42, wherein said digital gobo devices are digital mirror devices.

45. An apparatus as in claim 40, further comprising projecting light to the digital gobo assembly, and using the digital gobo assembly to form shaped and colored light output.

46. An apparatus as in claim 45, wherein said light is from a source that is at least 500 W.

47. An apparatus for projecting light, comprising:
a fiber optic device, receiving light at a first end and having a second end; a digital gobo device, adjacent said second end, and illuminated by an output of the fiber optic device;
  a controller that produces a digital control signal indicative of an image that shapes an outer edge of the light that is transferred, said control signal coupled to said digital gobo device to shape the outer edge of the light from the fiber optic device.

48. An apparatus as in claim 47, wherein said fiber optic device includes multiple separate fiber optic devices.

49. An apparatus as in claim 48, wherein said digital gobo device includes multiple devices, each adjacent a respective second end of one of said fiber optic devices.

50. An apparatus as in claim 49, wherein said controller produces separate control signals that respectively control the multiple digital gobo devices.

51. An apparatus as in claim 50, wherein the seperate control signals include a first part indicative of a first primary color component of said shape of light, a second part indicative of a second primary color component of said shape of light, and representing a different primary color component than said first primary color component, and a third part indicative of a third primary component of said shape of light, said third part representing a different primary color component than either said first primary color component or said second primary color component, and said controlling comprises using said first primary color component, said second primary color component and said third primary color components to separately control different portions indicative of said shape of light, to thereby pass a shaped and colored light that is based on all of said first part representing said first primary color component, said second part representing said second primary color component and said third part representing said third primary color component.

52. An apparatus as in claim 50, further comprising light coloring parts that color light such that each of the multiple digital gobo devices receives a different color of light.

53. An apparatus as in claim 49, wherein there are three fiber optic devices and three digital gobo devices.

54. An apparatus as in claim 47, wherein said digital gobo device is a digital mirror.

55. An apparatus as in claim 47, further comprising a light source that provides light to said fiber optic device, said light source being at least 500 W of power.

56. An apparatus for shaping a light beam using multiple control channels, comprising:

a controller, producing a first control channel for altering a first aspect of a beam of light, producing a second control signal channel for altering a second aspect of the beam of light, and producing a third control channel for altering a third aspect of the beam of light;
a digital gobo, receiving said first, second and third control channels to alter an applied beam of light, each of said central channels altering a different aspect of the beam of light, and said first, second and third control channels collectively operating to shape the output light beam according to a desired shaping signal that is contained within said first, second and third control channels.

57. An apparatus as in claim 56, wherein said aspects are colors.

58. An apparatus as in claim 56, wherein said aspects are intensities of light.

59. An apparatus as in claim 17, wherein said using comprises using said first control channel to control a first digital gobo device, using said second control channel to control a second digital gobo device, and using said third control channel to control a third digital gobo device.

60. An apparatus as in claim 59, further comprising optics which combine outputs from said first, second and third digital gobo devices.

61. An apparatus as in claim 56, wherein said control channels represent primary color components.

62. An apparatus as in claim 61, wherein said primary color components comprise red, green and blue components.

63. An apparatus, comprising:
a plurality of fiber-optic devices;
a light source, adjacent a first end of said fiber optic device;
a coloring part, that colors light, such that light output from the fiber optic device is colored, wherein at least one of the outputs is a different color than another of the outputs;
a plurality of digital gobo devices, each receiving a light output from one of said fiber optic devices, and separately controlled to control a different aspect of shaping a different color portion of the light output.

64. An apparatus as in claim 63, wherein said light source is at least 500 w.

65. An apparatus as in claim 64, wherein said coloring part produces outputs which represent different primary colors.

66. An apparatus as in claim 63, further comprising first optics which alter the light prior to launching the light team into the fiber-optic device.

67. An apparatus as in claim 66, further comprising second optics to alter the light after launching the light beam into the fiber-optic device.

68. An apparatus as in claim 63, further comprising optics to alter the light beam after launching the light beam into the fiber-optic device.

69. An apparatus, comprising:
a plurality of fiber-optic devices;
a first optical device positioned to alter light prior to launching into the fiber-optic devices;
a second optical device positioned to alter light after output from the fiber-optic devices;
a digital gobo, shaping the light after output from the fiber-optic devices to produce shaped light output based on the light from the fiber-optic devices.

70. An apparatus as in claim 69, wherein said optical devices are used to color the light.

71. An apparatus as in claim 70, wherein one optical device to colors the light in a different color than another of the optical devices.

72. An apparatus as in claim 71, wherein there are three of the fiber-optic devices, each colored with a different primary color.

73. An apparatus as in claim 69, further comprising a light source that produces at least 500 W of light output.

74. An apparatus as in claim 73, wherein said optical devices are used to focus the light.

* * * * *